(No Model.)

K. M. DEAN.
BAKING OR COOKING VESSEL.

No. 463,492. Patented Nov. 17, 1891.

Witnesses
M. B. Harris
M. V. Lewis.

Inventor
Kate M. Dean
by
Whitman + Wilkinson
her Attorneys

UNITED STATES PATENT OFFICE.

KATE M. DEAN, OF MEMPHIS, TENNESSEE.

BAKING OR COOKING VESSEL.

SPECIFICATION forming part of Letters Patent No. 463,492, dated November 17, 1891.

Application filed May 8, 1891. Serial No. 392,633. (No model.)

*To all whom it may concern:*

Be it known that I, KATE M. DEAN, a citizen of the United States, residing at Memphis, in the county of Shelby and State of Tennessee, have invented certain new and useful Improvements in Baking or Cooking Vessels; and I do hereby declare the following to be a full, clear, and exact description of the invention, such as will enable others skilled in the art to which it appertains to make and use the same.

My invention relates to vessels for baking or cooking; and it consists of certain improvements in the said vessels and in the covers therefor, which will be understood after reference to the accompanying drawings, wherein the same parts are indicated by the same letters.

Figure 1:
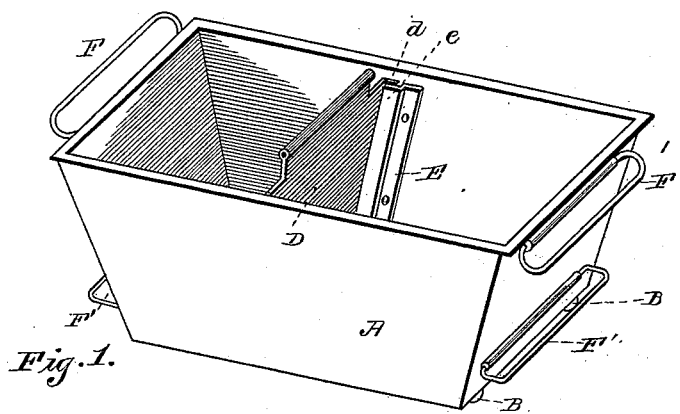
Figure 2:
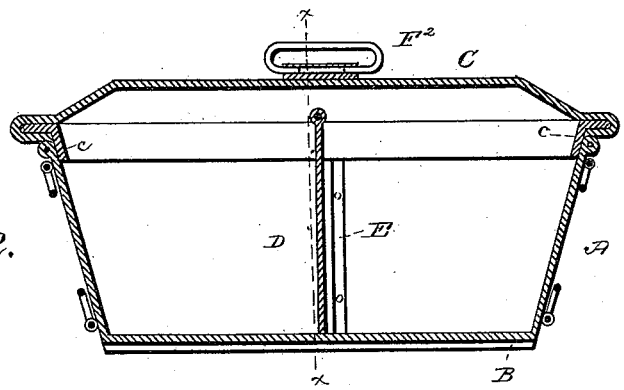
Figure 3:
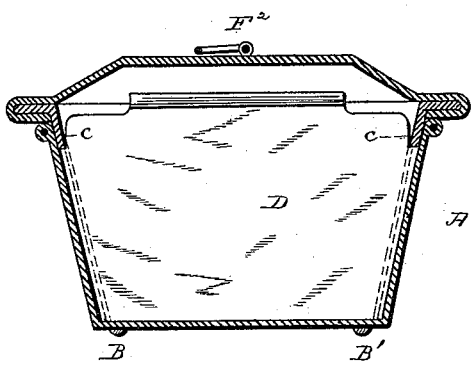

Figure 1 represents a perspective view of my improved bake-pan. Fig. 2 represents a longitudinal vertical section of the same. Fig. 3 represents a vertical section along the line $x\,x$ of Fig. 2, looking to the right.

A represents the pan, made of any suitable metal. B is a bead in the bottom thereof to keep the said pan clear of the heated floor of the oven and so prevent the burning of the article that is being cooked in the said pan. C represents the top to the said pan, having sloping lips $c$ fitting tightly in the upper part of the pan and forming a practically air-tight cover. D represents a partition in the said pan. This partition is bent near the end at $d$ to engage under the shoulder $e$ of the strip E, which is either riveted or otherwise attached to the interior of the pan A.

The partition D is first set up vertically in the pan and then slid along until the flange $d$ engages the shoulder $e$. By having the partition slide in the pan in the direction of the latter's greater diameter it is possible to use a wedge-shaped partition and to get the springy effect of the turned-over ends $d$ in pressing the sides of the pan apart, and so assisting materially in making a tight joint.

The pan A may be made of any desired length, and may have a plurality of partitions similar in every respect to the partition D.

F, F', and $F^2$ are handles, made of wire loops in accordance with the usual construction.

By having a practically air-tight cover the flavor and juices of meats, game, and other articles being cooked are retained and any blending of the flavors of other such articles cooking in the same oven is prevented. By having one or more partitions in the pan two or more articles of food may be cooked therein at the same time; moreover, the partition D being of metal and a good conductor of heat not only serves to separate the articles on either side of it, but also produces a similar effect to the use of two separate vessels, and, finally, by means of the beads B and B' the pan is raised from the heated floor of the oven and is subjected on all sides to the practically uniform heat of the oven.

Having thus described my invention, what I claim, and desire to secure by Letters Patent of the United States, is—

In a cooking utensil, the combination, with a pan A, having sides sloping outward, of a cover C, having lips $c$ adapted to fit snugly into the upper portion of said pan, the partition D, having flange $d$, the strip E, having shoulder $e$, adapted to engage said flange, and the beading B and B', attached to the bottom of said pan, substantially as described.

In testimony whereof I affix my signature in presence of two witnesses.

KATE M. DEAN.

Witnesses:
 ANNA M. LEE,
 HUNSDON CARY.